May 8, 1962

J. M. EMBREE 3,032,983

RAMJET/AFTERBURNER TAILPIPE TEMPERATURE
AND PRESSURE LIMITER
Filed Sept. 11, 1959

INVENTOR.
JOHN M. EMBREE

BY *Victor D. Behr*

ATTORNEY

United States Patent Office 3,032,983
Patented May 8, 1962

3,032,983
RAMJET/AFTERBURNER TAILPIPE TEMPERA-
TURE AND PRESSURE LIMITER
John M. Embree, Farmington, Conn., assignor to Curtiss-
Wright Corporation, a corporation of Delaware
Filed Sept. 11, 1959, Ser. No. 839,511
4 Claims. (Cl. 60—39.09)

This invention relates to improvements in jet engines and more particularly to a method and means for detecting and alleviating an excess stress condition in critical parts of the engine.

I have found that, from structural considerations, the allowable temperature for the ramjet or turbojet afterburner tailpipe and exit nozzle decreases as the pressure load on the skin increases. In a similar manner, the allowable internal presusre in the tailpipe and nozzle decreases with increasing gas temperature. Hence, in order to permit the engine designer to design for minimum weight, it is desirable to limit the combined temperature and pressure conditions of the engine skin in accordance with a predetermined limiting condition.

In accordance with my invention, I utilize a combined pressure-temperature detecting mechanism for giving a signal when the combined temperature and pressure conditions of the engine skin in the critical area became excessive, such signal, preferably automatically, being utilized to operate a suitable control for restoring engine conditions to a safe condition.

A principal object of my invention is to provide an automatic control within a jet engine which control is responsive to combined temperature and pressure conditions in the tailpipe and nozzle assembly whereby the engine pressure is reduced in accordance with excessive stress conditions resulting from jointly increasing temperatures and pressures above a predetermined maximum.

A more specific object of my invention is to limit the stress in a ramjet or turbojet afterburner tailpipe and exit nozzle as a function of temperature and pressure in the critical area.

A further object of my invention is to provide a simple, trouble-free, light weight and automatic control circuit for a jet engine actuated by a skin elongation bleed responsive to skin elongation and actuating a pneumatic circuit which will limit the richness of the air-fuel ratio to the engine combustion chamber in such a manner that excessive combined temperatures and pressures are avoided.

Further objects and advantages of my invention will appear from the following description of a preferred form of embodiment thereof, taken in connection with the attached drawings illustrative thereof, and in which.

Figure 1:
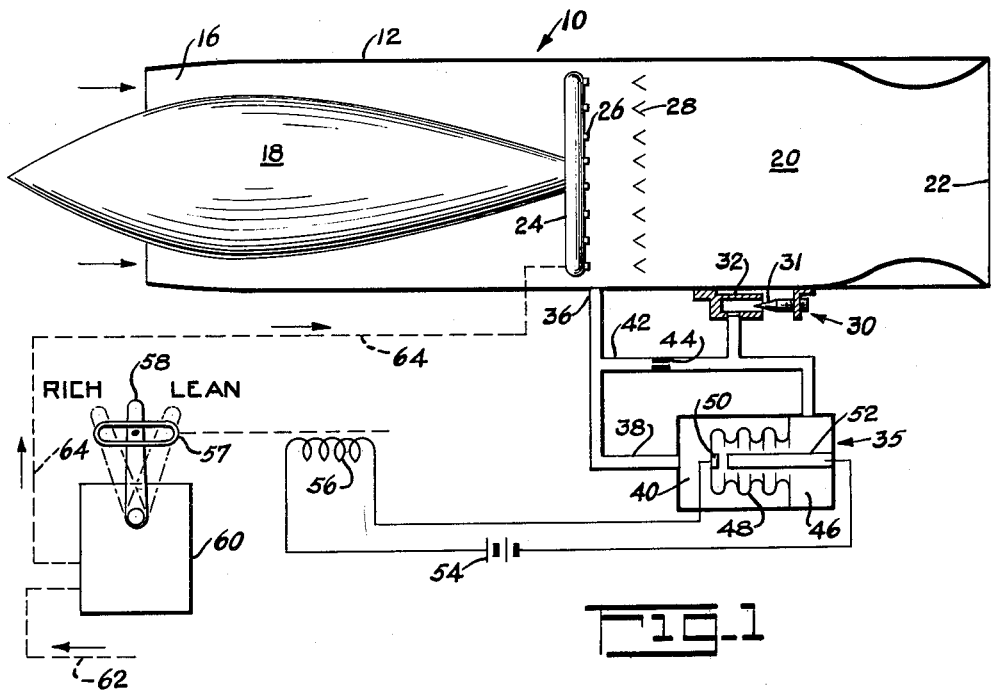
FIG. 1 is a schematic outline of a jet engine with an attached schematic showing of the control circuit and sensing device.

The jet engine which is schematically indicated at 10 as of the ramjet type but might also be a turbojet comprises an open ended duct 12 having a forwardly directed annular air entrance 16. The air entrance is formed by a central body 18 co-axially supported within said duct adjacent to its forward end and adapted to contain auxiliary equipment of the engine as for example fuel pumps and their controls.

The duct 12 also includes a combustion chamber 20 intermediate its ends and having an exhaust nozzle 22 at its rear end from which the combustion gases discharge to provide the power plant with forward propulsive thrust. Fuel is supplied to the combustion chamber through a manifold 24 which has a plurality of nozzles 26. This fuel mixes with the air entering the duct 12 to provide a combustible mixture for ignition in the combustion chamber 20. Flameholders, diagrammatically shown at 28 may also be used.

In accordance with my invention, I desire to limit the stress in the wall of the combustion chamber as in the region of the tailpipe if excessive stresses develop. For this purpose, I provide a skin sensing device 30 which is mounted directly on the skin of the combustion chamber 20 in the tailpipe region. For purposes of simplification, the skin sensing device 30 is shown as composed of a needle valve 31 and a housing 32 each of which is separately mounted at spaced points, so that expansion of the skin of the chamber will tend to open the valve and give a signal. Such expansion of the skin will take place primarily as a result of increasing temperatures but increasing pressure conditions also tend to cause elongation. Although the skin elongation device 30 is shown as secured to the engine wall or skin in a longitudinal direction, this is only for the purpose of clarity of disclosure as the device would normally be secured at circumferentially spaced points to take full advantage of small changes in dimension.

It is also to be understood that the skin elongation device is only schematically shown and that in commercial form it will be suitably housed and provided with the usual adjustments and compensating equipment. It will also be understood that although the device shown gives a signal by opening a valve, suitable linkage could be provided for closing a valve which would also give a signal. In either case, the signal is responsive to the linear expansion of the metal of the tailpipe of the combustion chamber.

The signal thus becomes evidence of dangerous operating conditions which may cause engine failure. While such a signal may be audible or visual, it is preferable to have remedial action taken at once. For this purpose, I provide a signal responsive control circuit as hereinafter described.

The signal responsive device which is considered preferable for jet engine applications is conveniently a pressure switch 35. This is supplied with air from the combustion zone as at 36, which, through line 38, enters high pressure chamber 40 of the switch. A balancing air pressure is connected through line 42 having orifice 44 with the low pressure chamber 46 and to the valve housing 32 in the sensing device 30.

The pressure switch 35 is conveniently provided with a bellows 48 which serves as a pressure balanced element. With the normal resilience of the bellows and the substantially balanced air pressure conditions, contact 50 carried by the bellows 48 is held away from the fixed contact 52. These contacts are in an electric circuit including a power source such as a battery 54 and a solenoid 56. This solenoid, when contacts 50 and 52 are closed, is adapted through a lost motion link member 57 to move the control arm 58.

A shown, the arm 58 is suitably the control arm for a fuel-air ratio controller 60 such as described in U.S. Patent 2,834,375, issued May 13, 1958, to Gallo and entitled "Fuel Flow Controller." Such a controller is mounted in the fuel line 62 to vary the fuel delivered through line 64 to the fuel manifold 24. It permits automatic setting of the fuel-air ratio under desired operating conditions. However, in accordance with my invention, the application of a signal to the solenoid 56 will move the arm 58 from a "rich" position toward a "lean" position and thus reduce the fuel input to the combustion chamber and thus reduce the combustion chamber pressure.

The control arm 58 may be on any other mechanism which will reduce the combustion chamber pressure such as a mechanism for modifying the geometry of the inlet opening 16 or opening of the exhaust nozzle 22 or both as is well known in the art.

It will now be comprehended that the operation of the controls in accordance with my invention is accomplished as a result of changes in the elongation of the skin or wall of the combustion chamber or tailpipe portion thereof to which the elongation sensing element 30 is secured. Under normal safe operating conditions the resilience of bellows 48 and the respective pressures in chambers 40 and 46 will keep the contacts apart. No effect is had on the control arm 58 and the arm may be moved to any desired position by other mechanism as desired.

If the pressure in the combustion chamber becomes excessive, this will immediately result in an increased pressure in the high pressure chamber 40 which, when it reaches an excessive state, will close the contacts 50 and 52 through a partial collapse of the bellows 48. The energization of the electric circuit will then give a control signal of any desired type including a direct impulse on solenoid 56 which, in turn, will retract loose link 57 and thus move the control arm 58 to an intermediate position. When the arm 58 operates a fuel-air ratio controller, it will reduce the richness of the mixture thus automatically reducing temperature and pressure in the combustion chamber.

Under increasing pressure conditions in the combustion chamber as reflected by the pressure at 36, and with the skin expansion bleed 30, open even a small amount, there is an increase in differential pressure on the bellows 48 of the switch 35 which tends to over-balance the bellows resilence and close the contacts of the actuating circuit. As the pressure continues to increase in the combustion chamber and tailpipe, the valve 31 tends to open and further increase the rate at which the differential pressure builds up over the bellows and forces the contacts to the closed position.

If the temperature of the skin or wall of the combustion zone as reflected by skin elongation becomes excessive, the needle valve 31 of the sensing device 30 will also give a signal to the signal responsive switch 35. With a bleeding of air from the low pressure chamber 46 of the switch 35 due to the opening of valve 31, the pressure on the actuator bellows 48 will become rapidly overbalanced to close the electric contacts and thus actuate the control arm 58.

Figure 2:
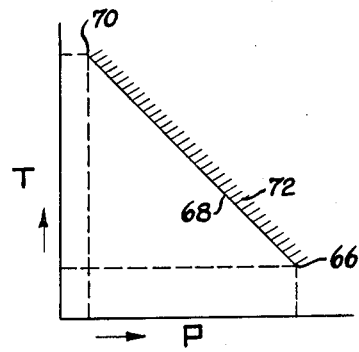
FIG. 2 is a chart illustrating the safe and danger limits of temperature and pressure in the combustion chamber of a jet engine.

The curve 68 in FIG. 2 is shown as a straight line between the points 66 and 70 which were established as maximum safe operating pressures for the temperature ranges of operation of a particular engine. For the most part, this indicates the safe operating limits of temperature and pressure which should not be exceeded for the operation of a jet engine. It shows that increasing pressures require a reduction in the maximum temperatures that can be tolerated and that increasing temperatures reduce the maximum pressures that can be tolerated.

Although the effect of gas pressure loads on skin expansion over the operating range is only about twenty percent of the temperature effect, it acts in the same sense which is desirable in that it helps to make the needle bleed less critical. Suitable proportions of orifices, bellows area and tensile strength and other design features will permit actuation of the control arm in close approximation to curve 68. As shown, the shaded side 72 of the curve 68 represents the area of unsafe operation.

It will thus be seen that I have provided a modulating control which gives a signal as a function of temperature-pressure or skin elongation conditions in the tailpipe. This signal, in turn, is effective to automatically limit or diminish the temperature-pressure conditions. Not only is the sensing device and associated controls of light weight and extremely simple in construction, but it will have the maximum operational reliability as the consequence of its few moving parts and small operating movements. Obviously, the electric circuit could be eliminated if no electrical control impulse were desired and the control arm could be operated from the bellows 48 through any other usual form of motor.

Such a construction of the skin elongation sensing actuator for a fuel-air ratio control makes it possible for the engine designer to design for a broader base of rich fuel-air ratio in the first instance for, if the rich fuel-air ratio should be excessive, the control will reduce it to a leaner position.

While I have described my invention in detail in its preferred embodiment, it will be obvious to those skilled in the art, after understanding my invention that various changes and modifications may be made therein without departing from the spirit or scope thereof. I aim, in the appended claims, to cover all such modifications.

I claim as my invention:

1. Apparatus for a jet engine having a chamber subjected to the engine combustion gases for providing a signal indicative of excessive stress within the walls of said engine chamber; said apparatus comprising a member movable in response to changes in the fluid pressure forces acting thereon; means connecting one side of said member to said chamber for subjecting said member to a first fluid pressure force proportional to the pressure within said chamber for urging said member in one direction and including additional fluid passage means having valve means and connecting the other side of said member for subjecting said member to a second fluid pressure force for urging said member in the opposite direction; means supporting said valve means on the wall of said chamber so that elongation of said wall is effective to move said valve means to reduce said second fluid pressure force relative to said first fluid pressure force; and means responsive to movement of said member to provide said signal.

2. Control apparatus for a jet engine having a chamber subjected to the engine combustion gases and having means operable to alter the pressure within said chamber; said control apparatus comprising means responsive to changes in the fluid pressure forces acting thereon; means for subjecting said responsive means to a first fluid pressure force proportional to the pressure within said chamber; means including valve means for subjecting said responsive means to a second fluid pressure force opposing said first fluid pressure force; means supporting said valve means on the wall of said engine chamber so that elongation of said wall is effective to move said valve to reduce said second fluid pressure force relative to said first fluid pressure force; and means operatively connected to said responsive means for effecting operation of said pressure altering means to reduce the pressure within said chamber when the stress in the chamber wall becomes excessive at the then existing wall temperature.

3. Control means as claimed in claim 2 and in which said pressure altering means comprises means for reducing the fuel-air ratio of the engine combustion mixture when said stress becomes excessive.

4. Control apparatus for a jet engine having a chamber subjected to the engine combustion gases and having means operable to alter the pressure within said chamber; said control means comprising a member movable in response to changes in the fluid pressure forces acting thereon; fluid passage means connecting one side of said member to said chamber for subjecting said member to a first fluid pressure force proportional to the pressure within said chamber for urging said member in one direction and including additional fluid passage means having a fixed restriction and a variable restriction and connecting the other to a second fluid pressure force for urging said member in the opposite direction; means supporting said variable restriction on the wall of said chamber so that elongation of said wall is effective to vary said restriction to reduce said second fluid pressure force relative to said first fluid pressure force; and means operatively connected to said movable member for effecting operation of said pressure altering means to reduce the pressure within said chamber when the stress in the chamber wall becomes excessive at the then existing wall temperature.

References Cited in the file of this patent

UNITED STATES PATENTS

| | | |
|---|---|---|
| 1,099,029 | Doble | June 2, 1914 |
| 2,429,005 | Watson | Oct. 14, 1947 |
| 2,669,094 | Lee | Feb. 16, 1954 |
| 2,746,242 | Reed | May 22, 1956 |
| 2,821,065 | Starkey | Jan. 28, 1958 |
| 2,837,893 | Schirmer | June 10, 1958 |
| 2,849,188 | Breese | Aug. 26, 1958 |
| 2,926,488 | Faught | Mar. 1, 1960 |

FOREIGN PATENTS

| | | |
|---|---|---|
| 883,671 | Germany | July 20, 1953 |